United States Patent [19]

Margetts

[11] 4,121,696
[45] Oct. 24, 1978

[54] DISC BRAKES FOR VEHICLES

[75] Inventor: Hugh Grenville Margetts, Leamington Spa, England

[73] Assignee: Girling Limited, Birmingham, England

[21] Appl. No.: 793,890

[22] Filed: May 4, 1977

[30] Foreign Application Priority Data

May 5, 1976 [GB] United Kingdom .............. 18324/76

[51] Int. Cl.² ..................... F16D 55/08; F16D 55/10; F16D 55/228
[52] U.S. Cl. .................................. 188/71.3; 188/71.9; 188/72.6; 188/72.7; 188/106 F; 188/196 F; 192/70; 192/70.23; 192/70.25; 192/83; 192/93 R
[58] Field of Search .................... 188/72.6, 72.7, 71.3, 188/71.5, 72.9, 106 P, 106 F, 196 F, 71.4; 192/70, 70.23, 70.25, 83, 93 R

[56] References Cited

U.S. PATENT DOCUMENTS

| | | | |
|---|---|---|---|
| 3,095,949 | 7/1963 | Butler | 188/106 F X |
| 3,167,156 | 1/1965 | Davis et al. | 188/71.3 |
| 3,289,795 | 12/1966 | Klaue | 188/71.3 |
| 3,344,891 | 10/1967 | Thirion | 188/72.7 X |
| 3,425,519 | 2/1969 | Frigger | 188/106 F X |
| 3,448,831 | 6/1969 | Newstead | 188/71.5 X |
| 3,482,657 | 12/1969 | Zeitrager | 188/106 F X |
| 4,030,576 | 6/1977 | Pringle | 188/72.6 |

*Primary Examiner*—George E. A. Halvosa
*Attorney, Agent, or Firm*—Scrivener, Parker, Scrivener & Clarke

[57] ABSTRACT

A disc brake assembly for a vehicle comprises a first inboard and a second outboard rotatable disc which are both relatively fixed and spaced axially. Superimposed friction pads for engagement with opposite faces of the discs are guided in a common drag-taking member which takes the drag on the pads when the brake is applied. A mechanical expander mechanism is housed between and acts directly upon the oppositely directed inner friction pads for engagement with the adjacent faces of the discs to apply the said oppositely directed pads to the discs, and a clamp assembly extending over the peripheral edge of both discs comprises coupled beams. The clamp assembly incorporates an actuator acting between one of the beams and one of the remaining friction pads to apply that friction pad to the inboard face of the inboard disc, and the other beam acting on the other remaining pad to apply thereto a reaction force in turn to apply that pad to the outboard face of the outboard disc.

16 Claims, 12 Drawing Figures

DISC BRAKES FOR VEHICLES

This invention relates to disc brake assemblies for vehicles comprising a first inboard and a second outboard rotatable disc which are both relatively fixed and spaced axially, the outboard disc being adjacent to the vehicle wheel, superimposed friction pads for engagement with opposite faces of the discs guided in a common drag-taking member which takes the drag on the pads when the brake is applied, and actuating means for applying the friction pads to the discs.

In known disc brake assemblies of the kind set forth the actuating means comprises first and second fluid-pressure operated actuators disposed on a chordal plane common to both discs, and each actuator is embodied in a clamp assembly which extends over the peripheral edge of a respective disc and comprises coupled beams, the actuator acting between one beam and the adjacent friction pad and the other beam acting on the other pad to apply thereto a reaction from the actuator.

It is preferable for both fluid-pressure actuators to be located on the inboard side of the inboard disc, which is the innermost side of the disc remote from the wheel of the vehicle when the brake assembly is installed in a vehicle, so as to be in the cooling air and to be clear of the wheel. This means that the beams have to be of substantial dimensions in order to transmit the brake applying forces such that substantially equal contact pressures are maintained over the entire pad area. Therefore, unless the spacing between the discs and therefore the axial length of the brake assembly is increased, which is undesirable due to space considerations, difficulty is experienced in installing the beams between the discs whilst, at the same time, maintaining the necessary strength. Also since the actuators for the pads which are engageable with the outboard disc, which is outermost and located adjacent to the wheel, comprise fully floating capsules consisting of hydraulic piston and cylinder assemblies with the cylinders acting on the inboard beam positioned adjacent to the outboard side of the inboard disc and the pistons acting on the outboard beam positioned adjacent to the outboard side of the outboard disc through draw-bars, difficulties arise in providing the additional space necessary to accommodate the capsules and arranging for hydraulic pipes or hoses to cater for travel of the capsules in an axial direction when the brake assembly is applied.

It is also known to provide an hydraulic actuator assembly between the adjacent faces of the discs to apply the inner pads to the discs. This has the disadvantage that the hydraulic fluids are likely to boil in the very hot region between the discs and special hydraulic fluids with high boiling points which overcome this problem are relatively expensive and unsuitable for other reasons.

The main problem is known disc brake assemblies of the kind set forth is that of actuation of the pads situated between the discs. This is due mainly to the limited axial space available.

According to our invention in a disc brake assembly of the kind set forth for vehicles a mechanical expander mechanism is housed between the disc and acts directly upon the oppositely directed inner friction pads for engagement with the adjacent faces of the discs to apply the said oppositely directed pads to the discs, and a clamp assembly extending over the peripheral edges of both discs comprises coupled beams and incorporates an actuator acting between one of the beams and one of the remaining friction pads to apply the friction pad to the inboard face of the inboard disc, the other beam acting on the other remaining pad to apply thereto a reaction force to apply that pad to the outboard face of the outboard disc.

Locating a mechanical expander mechanism between the discs which acts directly on the pads eliminates the necessity for providing beams of substantial dimension, and the expander mechanism can be incorporated in the brake within less space than that required to accommodate the beams. This permits the discs to be axially close together and thus easily installed inside the wheel of a vehicle. Also since a mechanical expander mechanism is provided a simple actuating mechanism extending over the peripheral edge of one of the discs can be provided.

Preferably the expander mechanism comprises a wedge and roller means lying in a plane parallel to the discs and displaceable in that plane to cause separation of the inner pads, and an actuating rod journalled for rotation in an axially extending bore in the stationary member includes a cam portion engageable with the wedge to effect displacement of the wedge and roller means upon rotation of the rod in response to operation of operating means. The rotation of the actuating rod does not interfere with the swept outline of the brake.

The operating means may comprise a fluid-pressure operable piston and cylinder assembly located on the same side of the brake as the actuator for the clamp assembly and operable simultaneously therewith.

The actuator for the clamp assembly may comprise at least one hydraulic piston working in a bore in the adjacent beam. Alternatively the actuator may comprise a second mechanical expander mechanism acting between the said one beam and the adjacent friction pad. For example, the second expander mechanism may also comprise wedge and roller means operable by a second actuating rod journalled for rotation in a second axially extending bore in the stationary member and including a second cam portion engageable with the wedge to effect displacement of the wedge and the roller means. In such a construction both operating rods extend in the same direction and are rotatable simultaneously, preferably by operation of common operating means. The operating means may comprise a floatingly mounted fluid-pressure operable piston and cylinder assembly acting between cranked end portions on the rods.

The or each mechanical expander mechanism preferably incorporates an automatic slack adjuster to compensate for wear of the friction pads. The adjuster is preferably located between the actuating mechanism and the expander mechanism so as not to interfere with axial installation space. For example, the expander may act between the cam and the wedge means.

Three embodiments of our invention are illustrated in the accompanying drawings in which.

The disc brake assembly illustrated in FIGS. 1 to 4 comprises first and second axially fixed and relatively spaced outboard and inboard rotatable discs 1 and 2 on a radial flange of a hub 3 which is rotatable with respect to a fixed stub axle 4. The axle 4 forms a mounting for a stationary drag-taking member 5 which starddles the peripheral edge of both disc 1 and 2.

Opposed friction pads 6 and 7 for engagement with opposite faces of the outboard disc 1 and opposed friction pads 8 and 9 for engagement with opposite faces of the inboard disc 2 are located in the stationary member 5 and are guided for movement towards and away from the disc on abutment surfaces 10, 11 at opposite ends of the stationary member 5. The drag on the pads when the brake is applied is taken by either of the surfaces 10 and 11 depending on the direction of rotation of the discs.

A clamp assembly 12 extends over the peripheral edges of both discs 1 and 2 and comprises an outboard beam 13 and an inboard beam 14 which are chordal with respect to the disc and which are coupled at their free ends by a pair of circumferentially spaced drawbars 15 which extend through clearance bores 16 in the stationary member 5.

The inboard beam 14 incorporates an actuator, being provided with a pair of hydraulic cylinders 17 in which work hydraulic pistons 18 for applying the adjacent friction pad 9 directly to the adjacent inboard face of the disc 2. The reaction on the beam 14 is transmitted through the draw-bars 15 to the beam 13 in order to urge the outward pad 6 into engagement with the outboard face of the disc 1.

A mechanical expander mechanism 19 is housed in the stationary member 5 between the remaining friction pads 7 and 8. The mechanism comprises a pair of transfer plates 20 and 21 engaging respectively with the friction pads 7 and 8. Each plate 20 and 21 is provided on its inner surface with spaced inclined ramps 22 and 23. A wedge 24 located between the places is provided with spaced inclined surfaces 25 and 26 which are parallel to but spaced from the ramp 22 and 23 and caged rollers 27 and 28 are located between the respective ramps 22, 23 and the inclined surfaces 25, 26.

The wedge 24 is displaceable in a lengthwise inward brake-applying direction to effect separation of the transfer plates 20 and 21 with the consequent application of the pads 7 and 8 on the adjacent faces of the discs 1 and 2, the transfer plates acting on the pads so that the contact pressure is substantially constant over the whole area of each pad.

Displacement of the wedge 24 in the brake-applying direction is achieved by a mechanical actuator mechanism comprising an actuating rod 29 which is rotatably mounted in needle roller bearings in a blind bore 30 in the stationary member 5 which is normal to the axis of the wedge 24. The bearings are protected by rubber seals (not shown). The rod 29 projects from the bore at the end adjacent to the inboard beam 14 which houses the cylinders 17 and acts on the wedge 24 through a thrust transmitting assembly 31. The rod 29 is provided with a cam surface or notch 32 in which is received a cam 33 at the one end of the assembly 31. Thus rotation of the rod transmits force through the assembly 31 to the wedge 24, and resultant movement of the wedge in a direction parallel to the plane of the disc transmits axial movement to the pads 7, 8 through the rollers 27, 28 and transfer plates 20, 21.

Rotation of the rod 29 to displace the wedge is achieved by a fluid-pressure operated piston and cylinder assembly 34 of which the piston rod 35 acts on a cranked abutment end portion 36 of the rod 29.

Operation of the piston and cylinder assembly 34 is arranged to take place simultaneously with pressurisation of the cylinders 17 so that the pads are all applied to the discs simultaneously.

Figure 1:
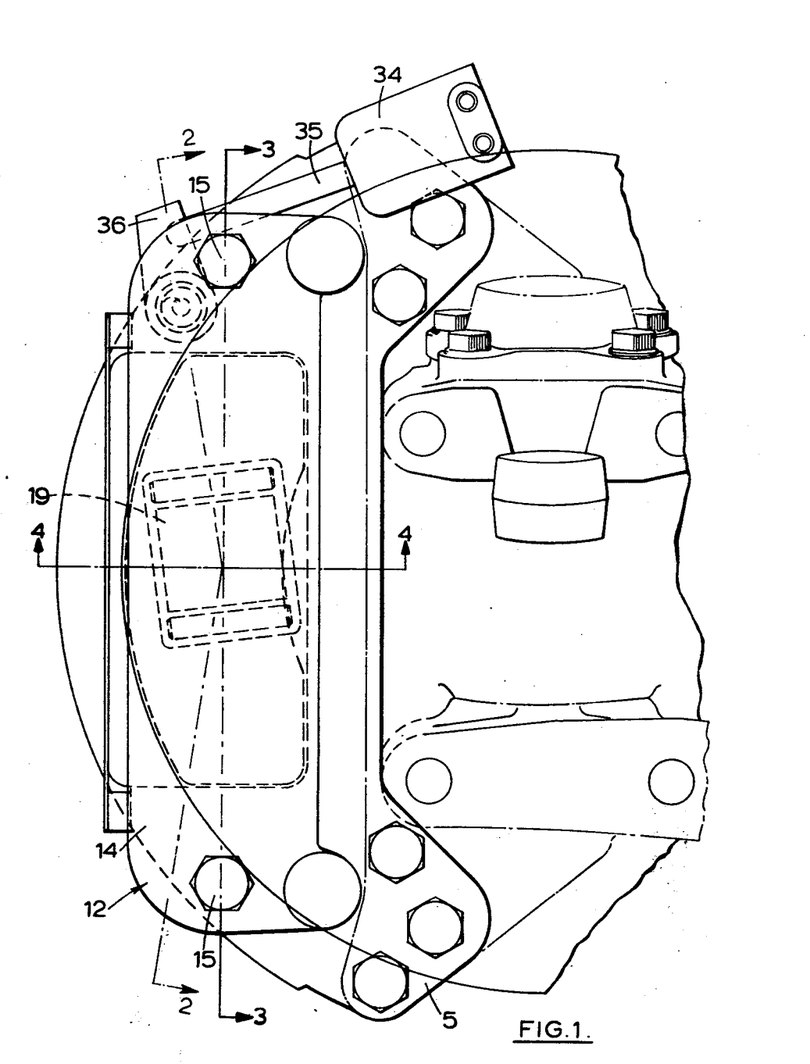
FIG. 1 is an end elevation of a disc brake assembly for a vehicle.
Figure 2:
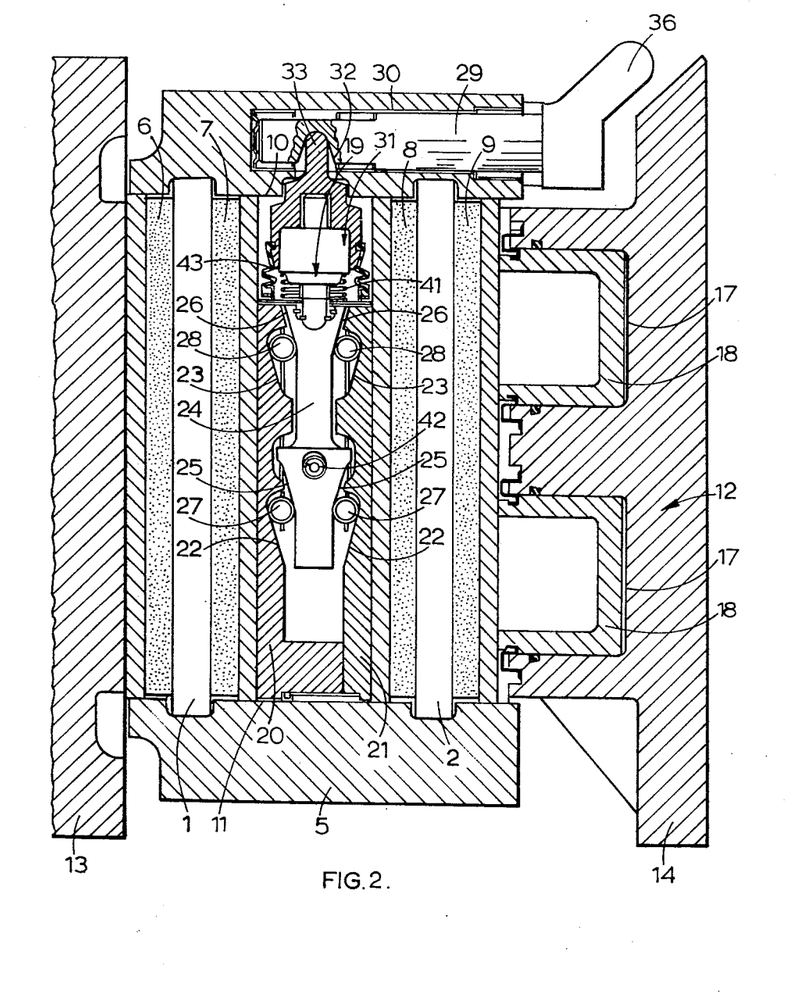
FIG. 2 is a section on the line 2—2 of FIG. 1.
Figure 3:
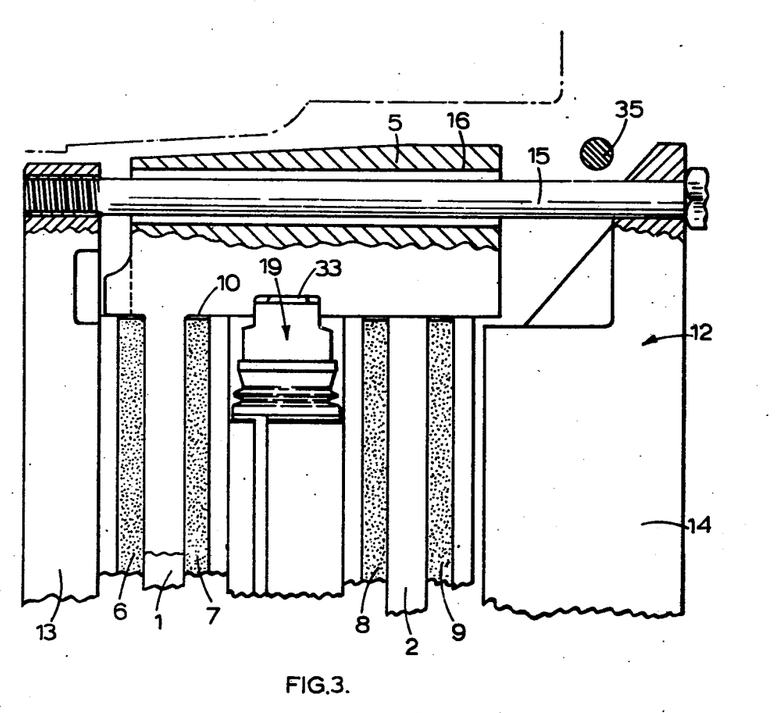
FIG. 3 is a section on the line 3—3 of FIG. 1.
Figure 4:
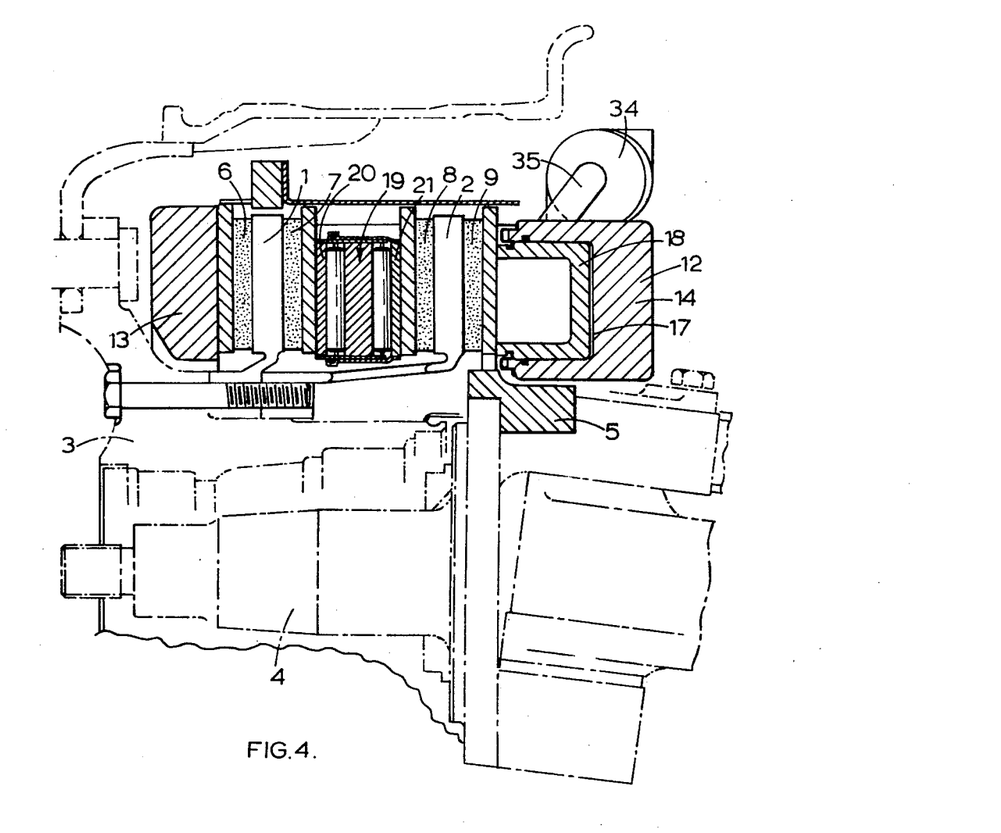
FIG. 4 is a longitudinal section through the brake assembly on the line 4—4 of FIG. 1.
Figure 5:
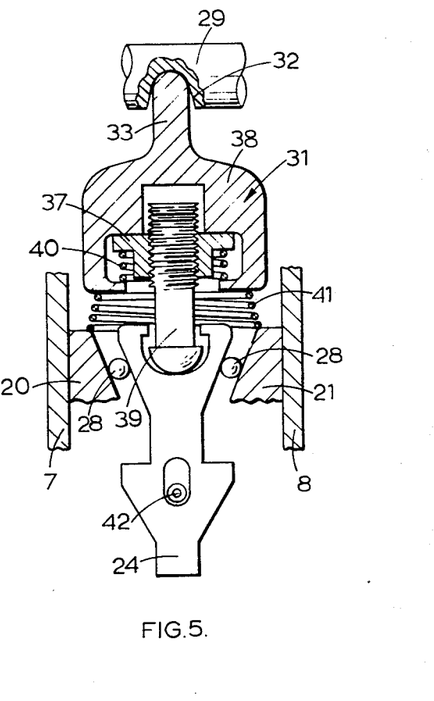
FIG. 5 is a section on an enlarged scale of part of a mechanical expander showing a slack adjuster.
Figure 6:
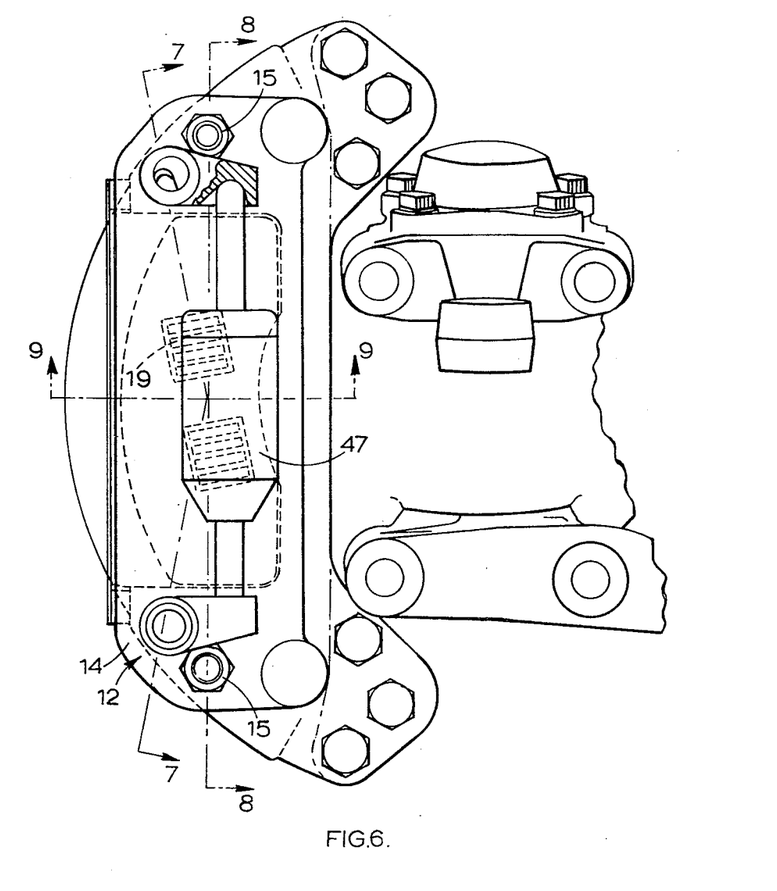
FIG. 6 is an end elevation similar to FIG. 1 of a second disc brake assembly.
Figure 7:
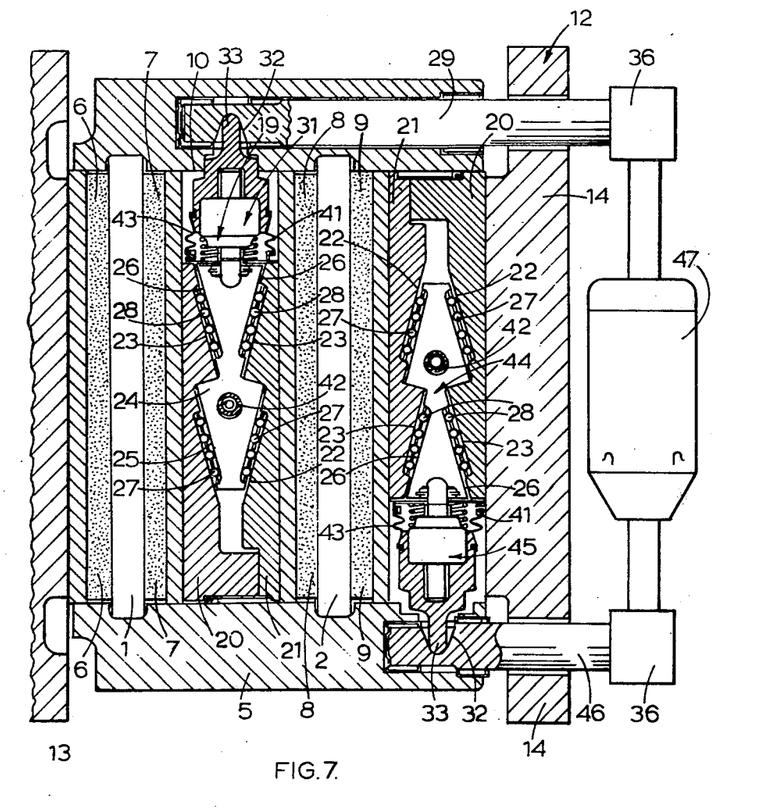
FIG. 7 is a section on the line 7—7 of FIG. 6.
Figure 8:
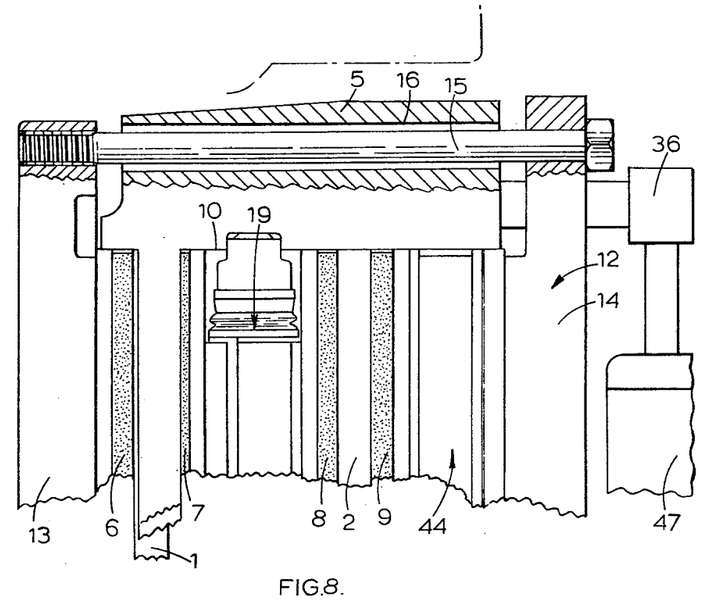
FIG. 8 is a section on the line 8—8 of FIG. 6.
Figure 9:
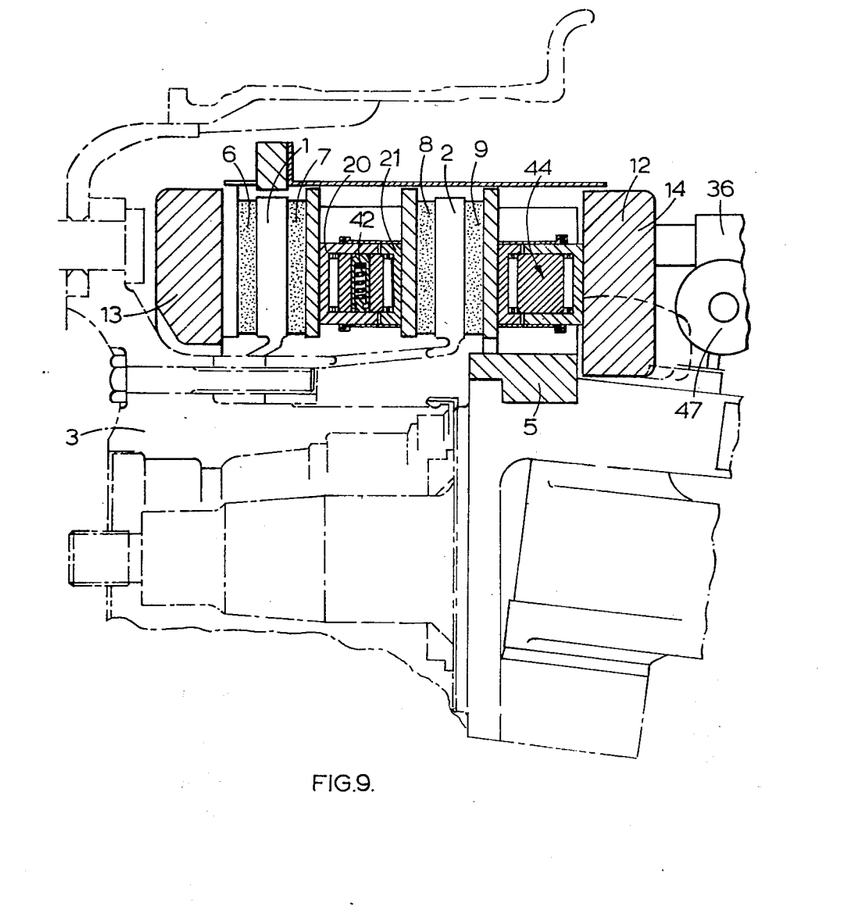
FIG. 9 is a longitudinal section through the brake assembly on the line 9—9 of FIG. 6.

The thrust transmitting assembly 31 incorporates an automatic slack adjuster for maintaining the braking clearances within certain limits to compensate for wear of the friction pads 7 and 8. As illustrated in FIG. 5 the slack adjuster comprises a screw-threaded assembly comprising a nut 37 bearing on a shoulder in a push rod 38 carrying the cam 33 and a threaded strut 39 screwed into the nut 37 and acting on the wedge 24 through a lost-motion connection. A compression spring 40 normally urges the nut 37 into engagement with the shoulder in the push rod 38, and a second compression spring 41 normally urges the push rod 38 away from the transfer plates 20 and 21. A friction spring 42 extends through an opening in the wedge 24 lying in a line normal to the main axis thereof and is movable with the wedge 24 in a brake applying direction when movement of the wedge 24 exceeds a predetermined value when the brake is applied.

The friction spring 42 normally remains at the furthest point in the travel of the wedge in the application of the brake so that, when the brake is released, the wedge 24 is prevented by the friction spring 42 from returning with the screw-threaded assembly under the influence of the force in the spring 41 and after the lost-motion in the connection has been taken up. Further movement of the thrust member 39 is that direction is thereby prevented and the push-rod 38 moves away relatively from the nut 37. However, since the nut 37 is loaded by the spring 40 which exerts on it a force greater than the frictional force between the threads, the nut 37 is rotated by the spring 40 to follow the push rod 38, thereby increasing the effective length of the thrust transmitting assembly 31.

In the embodiment described above to facilitate installation the axis of the wedge 24 is inclined with respect to a common chord of the discs 1 and 2. This enables the draw-bars 15 themselves to lie on the chords passing through the centres of pressure of the pads 6 to 9. For installation purposes the expander mechanism is fully expanded before the pads are inserted so that the assembly is short enough in the direction parallel to the plane of the discs for the cam 33 to engage in the notch 32. The expander is then wound back to the unexpanded position so that the pads can be installed.

The expander mechanism 19 and the slack adjuster are incorporated in a sealed unit by the provision of a sliding seal assembly 43 which encloses the adjuster and fits around the transfer plates 20 and 21.

In the brake illustrated in FIGS. 6 to 9 the hydraulic cylinders 17 and piston 18 are omitted, and the inboard beam 14 is reduced in thickness, a second mechanical expander mechanism 44 being located between the beam 14 and the friction pad 9 with a second automatic slack adjuster 45 disposed between the expander mechanism 44 and a second actuating rod 46 which is journalled for rotation in a bore in the stationary member 5 at the circumferentially opposite end of the brake from the rod 29.

The two rods 29 and 46 project through clearance openings in the beam and are rotatable simultaneously in opposite directions by operation of a floatingly mounted actuator assembly 47, which may be electrically operated or comprise a fluid-pressure operated piston and cylinder assembly utilising pneumatic or hydraulic pressure.

The expander mechanisms 19 and 44 include pluralities of rollers 27, 28 between the wedge and the transfer plates 22, 20 and 21.

Since the expander mechanism 44 and the slack adjuster 45 are identical in construction to the expander mechanism 19 and the slack adjuster incorporated in the assembly 31 no further description is required and corresponding reference numerals have been applied to corresponding parts. Since the brake is otherwise identical in construction to that of FIGS. 1 to 5 corresponding reference numerals have also been applied to corresponding parts of the brake.

Figure 10:
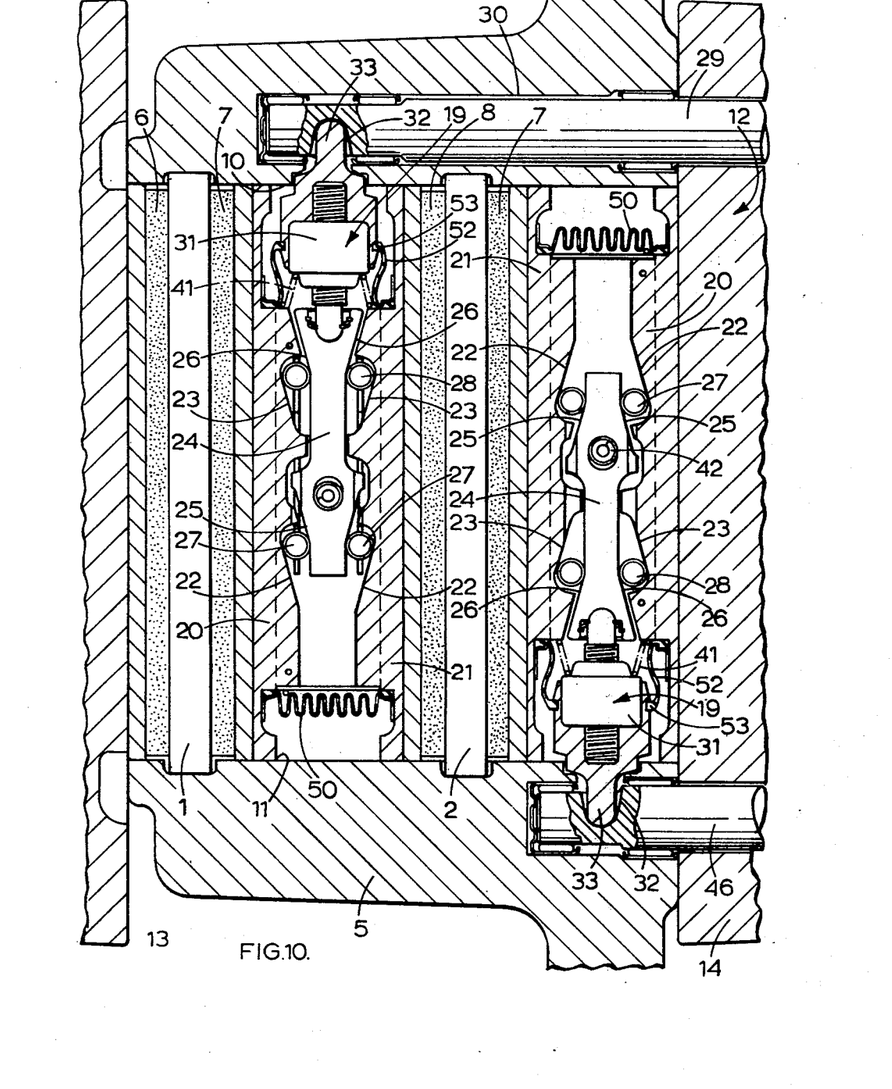
FIG. 10 is a section similar to that of FIGS. 2 and 7 through a modified brake assembly.
Figure 11:
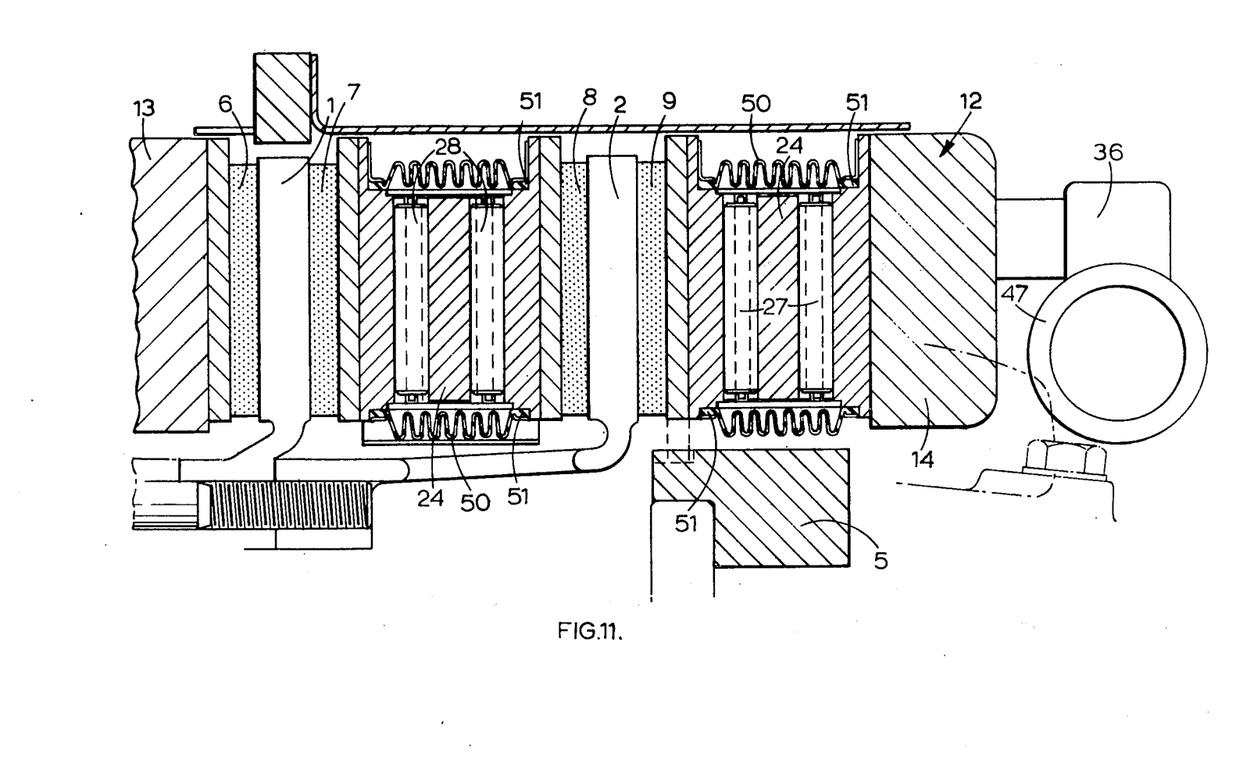
FIG. 11 is a longitudinal section similar to that of FIGS. 4 and 9 through the brake assembly shown in FIG. 10.
Figure 12:
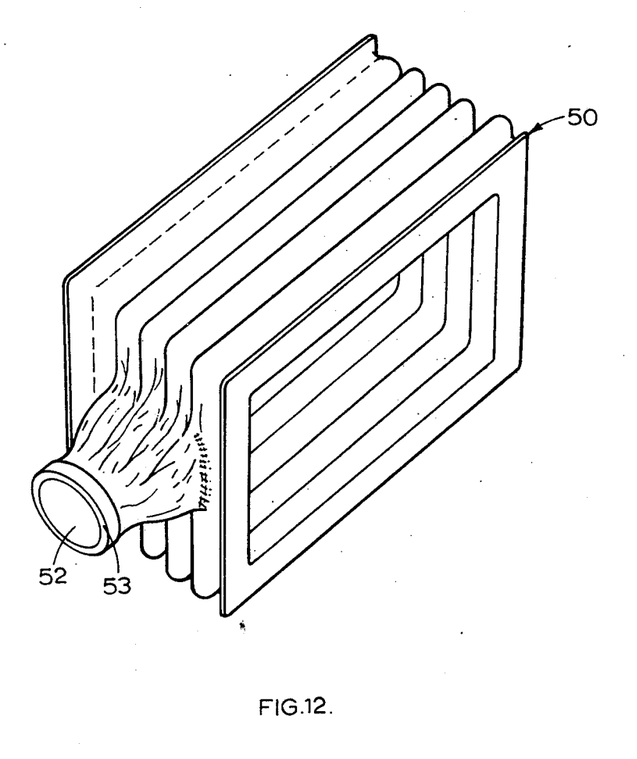
FIG. 12 is a perspective view of a seal for use in the disc brake assembly.

The brake illustrated in FIGS. 10 and 11 is of similar construction to that of FIGS. 6 to 9 and corresponding reference numerals have been applied to corresponding parts, In this embodiment single caged rollers 27 and 28 are located between the respective ramps 22, 23 and inclined surfaces 25, 26 of the two mechanical expander mechanisms and the sliding seal assembly has been replaced by a concertina-like expanding seal 50, which is shown in detail in FIG. 12. The seal 50 is mounted in recesses 51 provided in the inner faces of the transfer plates 20 and 21 and encloses the expander mechanism and slack adjuster, having an open mouth portion 52 which fits over the thrust transmitting assembly 31. A lip 53 on the mouth portion 52 is in sealing engagement with the outer face of the assembly 31.

It will be understood that a seal of the kind shown in FIG. 12 may be used to seal the adjuster and expander mechanism in any of the brake assemblies described above.

I claim:

1. A disc brake assembly for a vehicle comprising a first inboard axially fixed disc, a second outboard axially fixed disc spaced axially from said first disc, each disc having an inner face and an outer face, said inner faces being adjacent to each other, a drag-taking member extending over the peripheral edges of both said discs, first and second friction pads for engagement with said inner and outer faces of said inboard disc, third and fourth pads for engagement with said inner and outer faces of said outboard disc, a mechnical expander mechanism housed in said drag-taking member between and acting directly upon said first and third friction pads, a mechanical actuating mechanism for operating said expander mechanism, said actuating mechanism comprising an axially extending actuating rod journalled for rotation in an axially extending bore in said stationary member and extending over the perpheral edge of one of said discs, means to effect actuation of said expander mechanism in response to rotation of said rod, and operating means for rotating said rod located adjacent to said outer face of the said one disc over the peripheral edge of which said rod extends, and a clamp assembly extending over said peripheral edges of both said discs, said clamp assembly comprising coupled first and second beams and incorporating an actuator acting between said first beam and said second friction pad to apply that pad to said outer face of said first inboard disc, and said second beam acting on said fourth friction pad to apply thereto a reaction force to apply that pad to said outer face of said second outboard pad.

2. A disc brake assembly according to claim 1, wherein said expander mechanism comprises a wedge and roller means lying in a plane parallel to the discs and displaceable in that plane to cause separation of said first and third pads, and said actuating rod includes a cam portion engageable with said wedge to effect displacement of said wedge and said roller means upon rotation of said rod.

3. A disc brake assembly according to claim 2, wherein said expander mechanism incorporates an automatic slack adjuster to compensate for wear of the friction pads.

4. A disc brake assembly according to claim 3, wherein said adjuster is located between said mechanical actuating mechanism and said expander mechanism.

5. A disc brake assembly according to claim 4, wherein said adjuster acts between said cam and said wedge, said adjuster comprising a nut bearing on said cam and a threaded strut screwed into said nut and acting on said wedge through a lost-motion connection.

6. A disc brake assembly according to claim 2, wherein said expander mechanism is incorporated in a sealed unit comprising a concertina-like expandable seal.

7. A disc brake assembly as claimed in claim 2, wherein said expander mechanism includes a pair of axially separable transfer plates separate from and engaging directly with said first and third friction pads, and said wedge and roller means are located between said transfer plates to cause axial separation of said transfer plates and apply said first and third pads to said discs.

8. A disc brake assembly according to claim 1, wherein said operating means comprises a fluid-pressure operable piston and cylinder assembly located on the same side of said brake as said actuator for said clamp assembly and operable simultaneously therewith.

9. A disc brake assembly according to claim 1, wherein said actuator for said clamp assembly comprises at least one hydraulic piston working in a bore in the said first beam.

10. A disc brake assembly according to claim 1, wherein said actuating rod extends over the peripheral edge of said inboard disc, and said actuator for said clamp assembly comprises a second mechanical expander mechanism housed in said drag-taking member and acting between said first beam and said second friction pad.

11. A disc brake assembly according to claim 10, wherein said second expander mechanism comprises second wedge and roller means lying in a plane parallel to said discs and operable by a second actuating rod which is separate from said first rod and which is journalled for rotation in a second axially extending bore in said stationary member, said second rod including a second cam portion engageable with said wedge to effect displacement of the wedge and said roller means.

12. A disc brake assembly as claimed in claim 11, wherein said second expander mechanism includes a second pair of axially separable transfer plates separate from and engaging directly with said beam and said second friction pad, and said second wedge and roller means are located between said transfer plates to cause axial separation of said transfer plates of said second pair and relative movement between said beam and said second friction pad in directions away from each other.

13. A disc brake assembly according to claim 11, wherein both said operating rods extend in the same direction and common operating means are incorporated for rotating both said operating rods simultaneously.

14. A disc brake assembly according to claim 13, wherein said operating means comprises a floatingly-mounted fluid-pressure operated piston and cylinder assembly, and said rods have cranked end portions between which said fluid-pressure operated assembly acts.

15. A disc brake assembly according to claim 11, wherein said expander mechanism incorporates an automatic slack adjuster to compensate for wear of the friction pads.

16. A disc brake assembly according to claim 11, wherein said expander mechanism is incorporated in a sealed unit comprising a concertina-like expandable seal.

* * * * *